US007324995B2

(12) United States Patent
Findleton et al.

(10) Patent No.: US 7,324,995 B2
(45) Date of Patent: Jan. 29, 2008

(54) METHOD FOR RETRIEVING AND MODIFYING DATA ELEMENTS ON A SHARED MEDIUM

(75) Inventors: Iain B. Findleton, Baie d'Urfe (CA); Gautham Sastri, Montreal (CA); Steven R. McCauley, Montreal (CA); Xinliang Zhou, Longueuil (CA)

(73) Assignee: Rackable Systems Inc., Montréal (CA)

( * ) Notice: Subject to any disclaimer, the term of this patent is extended or adjusted under 35 U.S.C. 154(b) by 619 days.

(21) Appl. No.: 10/714,398

(22) Filed: Nov. 17, 2003

(65) Prior Publication Data

US 2005/0108231 A1    May 19, 2005

(51) Int. Cl.
*G06F 17/30* (2006.01)
*G06F 17/00* (2006.01)
(52) U.S. Cl. .......................................... 707/8; 707/203
(58) Field of Classification Search .................... 707/8, 707/203, 200, 201; 709/213, 214; 711/150
See application file for complete search history.

(56) References Cited

U.S. PATENT DOCUMENTS

| 4,897,781 | A |   | 1/1990  | Chang et al.    |
|-----------|---|---|---------|-----------------|
| 5,123,104 | A |   | 6/1992  | Levine          |
| 5,151,989 | A |   | 9/1992  | Johnson         |
| 5,630,096 | A |   | 5/1997  | Zuravleff       |
| 5,657,472 | A |   | 8/1997  | Van Loo et al.  |
| 5,813,016 | A | * | 9/1998  | Sumimoto ........ 707/201 |
| 5,860,159 | A |   | 1/1999  | Hagersten       |
| 5,864,837 | A |   | 1/1999  | Maimone         |
| 5,893,160 | A |   | 4/1999  | Loewenstein     |
| 5,987,506 | A |   | 11/1999 | Carter et al.   |
| 6,154,816 | A |   | 11/2000 | Steely          |
| 6,161,169 | A |   | 12/2000 | Cheng           |
| 6,173,378 | B1|   | 1/2001  | Rozario et al.  |
| 6,182,196 | B1|   | 1/2001  | DeRoo           |
| 6,237,067 | B1|   | 5/2001  | Eberhard        |

(Continued)

FOREIGN PATENT DOCUMENTS

EP    0 501 160 A2    2/1992

(Continued)

OTHER PUBLICATIONS

Helal et al, "Adaptive Transaction Scheduling", ACM 1993, pp. 704-713.*

(Continued)

*Primary Examiner*—Uyen Le
(74) *Attorney, Agent, or Firm*—Ogilvy Renault, LLP

(57) ABSTRACT

A method for retrieving and modifying data elements on a shared medium following request from multiple client computers, such that data retrieval transactions on a data element, originating from one or more clients, are not compromised by data update transactions on the same data element originating from other clients. The shared medium controller receives from multiple clients transaction requests for reading or writing a data element stored on the shared medium. The transactions requests are added to an execution queue in order. All read transaction requests are then retrieved and executed in parallel, up to a write transaction request on the data element. The write transaction request is then executed while all incoming read transaction requests for the same data element are queued until the write transaction request is completed.

22 Claims, 6 Drawing Sheets

U.S. PATENT DOCUMENTS

| | | | |
|---|---|---|---|
| 6,247,099 B1* | 6/2001 | Skazinski et al. | 711/141 |
| 6,272,662 B1* | 8/2001 | Jadav et al. | 714/805 |
| 6,321,236 B1 | 11/2001 | Zollinger et al. | |
| 6,389,420 B1 | 5/2002 | Vahalia et al. | |
| 6,449,700 B2 | 9/2002 | Hagersten | |
| 6,493,804 B1* | 12/2002 | Soltis et al. | 711/152 |
| 6,611,895 B1 | 8/2003 | Krull | |
| 6,615,373 B2* | 9/2003 | Elko et al. | 714/47 |
| 2002/0016795 A1* | 2/2002 | Bamford et al. | 707/202 |
| 2002/0055966 A1 | 5/2002 | Border | |
| 2002/0099729 A1* | 7/2002 | Chandrasekaran et al. | 707/203 |
| 2002/0188821 A1 | 12/2002 | Wiens | |
| 2002/0194206 A1 | 12/2002 | Ganesh | |
| 2003/0028695 A1* | 2/2003 | Burns et al. | 710/200 |
| 2003/0069902 A1 | 4/2003 | Narang et al. | |
| 2003/0093630 A1 | 5/2003 | Richard | |
| 2004/0044865 A1* | 3/2004 | Sicola et al. | 711/162 |

FOREIGN PATENT DOCUMENTS

WO     WO03012578     2/2003

OTHER PUBLICATIONS

Reiman et al, "Performance Analysis of Concurrent-Read Exclusive-Write", ACM 1991, pp. 168-177.*

IBM Technical Disclosure Bulletin : "Method for Performance Enhancement In the Parallel Execution of Static Database Transactions", IBM Corp., New York, US, vol. 37, No. 8, Aug. 1994, pp. 609-614.

IBM Technical Disclosure Bulletin: "Elimination of Lock Contention In Relational Databases Accessed by Read-Only Queries and On-Line Update Transactions", IBM Corp., New York, US, vol. 31, No. 1, Jun. 1988, pp. 180-185.

Amiri et al.: "Highly Concurrent Shared Storage", Distributed Computing Systems, 2000, Proceedings, 20th International Conference on Taipei, Taiwan Apr. 10-13, 2000, Los Alamitos, CA, USA, IEEE Comput. Soc., US, Apr. 2000, pp. 298-307.

* cited by examiner

--Prior Art--

METHOD FOR RETRIEVING AND MODIFYING DATA ELEMENTS ON A SHARED MEDIUM

CROSS-REFERENCE TO RELATED APPLICATIONS

The application is cross-referenced to U.S. patent application 2005/0108300, entitled "Method for the Management of Local Client Cache Buffers in a Clustered Computer Environment".

FIELD OF THE INVENTION

The invention relates to sharing a medium between multiple clients that use it for storage and retrieval of information. More specifically, it relates to a medium shared by multiple clients who are initiating both data retrieval and data modification transactions asynchronously with respect to each other and the problem of ensuring that the results of the retrieval operations are temporally consistent.

BACKGROUND OF THE INVENTION

The growth in the deployment of large agglomerations of independent computers as computational clusters has given rise to the need for the individual computers in these clusters to access common pools of data. Individual computers in clusters need to be able to read and write data to shared storage devices and shared display devices. Because a cluster may be assembled from many thousands of individual computers, each of which generates data access requests on an independent basis, enabling shared access to a common data pool requires the deployment of a scheme that ensures that the data retrieved by some of the computers in the cluster is not corrupted by the incidence of data modification activity produced by other computers in the cluster.

In a typical clustered computer deployment, there is a shared storage medium, such as a single disk drive or a memory unit or a digital display device, with a so-called frame buffer design, connected via a data transport network 23 to a number of independent computers. The function of the computers is to process data that is held on the storage medium in some fashion, during the course of which activity, the data on the storage medium is being both read and written by the computers.

The computers that make up the cluster process the data on the shared medium asynchronously. There is no supervisory mechanism in place that has the effect of granting the individual computers the right to access the data on the storage medium in a fashion that ensures even the integrity of data retrieval.

Any transaction produced by one of the cluster computers is characterized by its occupancy in a time window that begins with the time the transaction is initiated by the computer, and spans the combined time periods required to transport the transaction to the storage medium, execute the transaction, and to initiate transport of the response to the transaction back to the computer. During this time span one or more of the other computers sharing the storage medium could have initiated a data modification transaction that is characterized by a time of initiation that is after the time of initiation of the original transaction but within its time span. Without intervention, the data on the storage medium could conceivably be modified during the time that it is being prepared from transmission to the original computer.

Other scenarios that have the potential for producing undesirable results from transactions produced in a clustered computer environment include the arrival at the storage medium of out of order transactions, a when a data retrieval transaction followed by a data update transaction for the same computer arrive in reverse order, or when a data update transaction is executed while multiple other computers are in the process of retrieving the same data element.

The traditional approach to addressing the problem of shared access to data element on a shared storage medium is to implement a scheme of locks that have the effect of serializing access to the data element by forcing the transaction initiators to wait until it gains exclusive access to a lock on the data element. The specific implementation of the locking mechanism is dependant on a variety of factors related to the nature of the computing application being used, the volatility of the data stored on the storage medium, and the scale of the computer cluster in use. Regardless of the specifics of the implementation, all of the schemes found in prior art have the effect of imposing on the transaction initiator the requirement to schedule its transactions in a manner that ensures atomically correct access to the data element in question.

FIG. 1 is an example of a typical scheme found in prior computer related art dealing with the issues of shared access to a storage or display medium. A centralized scheme of access management is implemented by using a meta-data controller (MDC) or a centralized lock manager. Computers in the cluster are required to first contact the MDC or lock service to gain authority to access the shared storage medium. When they gain the required authorization, the computers submit transactions to the shared storage medium controller. When their transactions are completed, they contact the MDC or lock manager again to release the access authority so that other computers can gain access to the storage device.

In prior computer related art, typical examples of the use of lock mechanisms to address the problems of multiple computer access to shared storage media include the introduction of centralized meta-data controller systems, the use of event driven input/output schedulers, the use of pseudo-channel semaphores, and the use of remote procedure call based callback mechanisms. A characteristic of all of these mechanisms is that all transactions are serialized through a single gateway path controlled through the lock mechanism. Use of this type of mechanism requires the transaction initiators to acquire and maintain knowledge of the state of the target data element, and consequently schedule its transactions based on shared management of that state.

A significant drawback to the design of schemes found in prior computer related art is that as the number of client computers increases, the load on the centralized MDC or lock manager increases to the level that access to the storage device eventually becomes degraded. The requirement that client computers contact the centralized access control service in order to schedule their own data access transaction inevitably limits the per client transaction rate to the capacity of the MDC or lock manager to handle access requests. Regardless of the efforts that may be made to increase the performance characteristics of the centralized service, rising numbers of clients will always overwhelm the capabilities of the MDC.

Therefore, there is a need for a system and method for scheduling transactions and managing shared access to a storage medium in order to ensure client centered consistency, without the use of a centralized locking system, therefore without imposing a limit to the scalability of the shared storage system nor to the number of concurrent clients that can access the data on the same shared storage system.

SUMMARY OF THE INVENTION

According to a first broad aspect of the present invention, there is provided a method for retrieving and modifying data elements on a shared medium, comprising: receiving at a shared medium controller from multiple clients, transaction requests for at least one of reading and writing a data element on the shared medium; adding the transaction requests to an execution queue in order, retrieving from the execution queue and executing all read transaction requests for the data element in parallel, up to a write transaction request for the data element; executing the write transaction request for the data element and queuing all incoming read transaction requests for the data element until the write transaction request is completed, such that data retrieval transactions on the data element, originating from one or more clients, are not compromised by data update transactions on the data element originating from other clients.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

Figure 1:
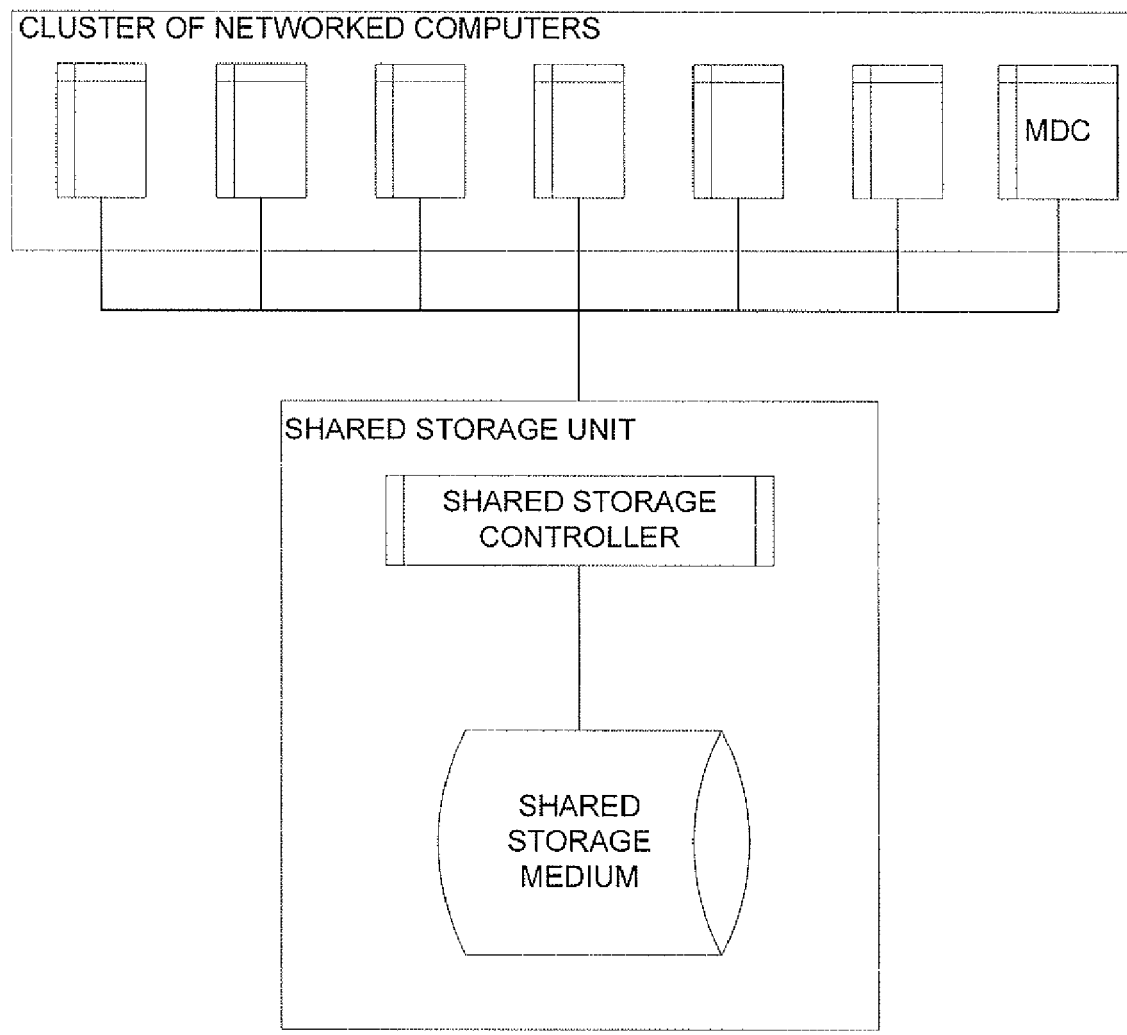
FIG. 1 is a schematic diagram of the mechanism typically found in the prior art for addressing the issues of multiple client access to a shared storage device.
Figure 2:
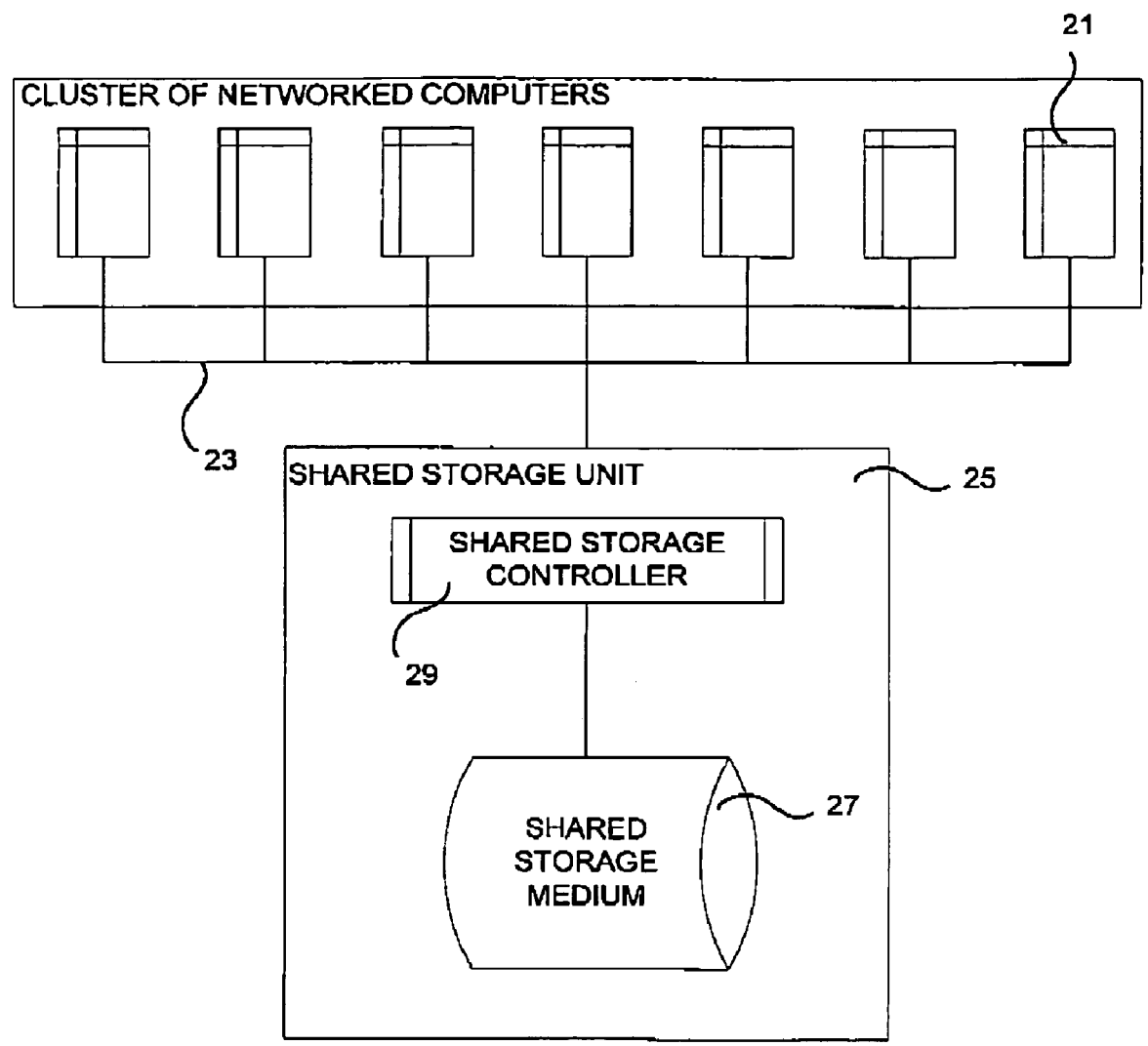
FIG. 2 is a schematic diagram of a cluster of computers implementing shared access to a writable storage medium according to a preferred embodiment of the present invention.

FIG. 2 illustrates a possible and preferred embodiment of the present invention. A cluster of computers are connected via a computer communications network 23 to a shared medium storage controller 29 which is, itself, part of a disk storage sub-system.

There are other possible embodiments thereof, such as the use of the invention to manage access to a shared access frame buffer device, or, in a different embodiment of the present invention, to an aggregation of storage devices. The invention may also be embodied as a dedicated device controller constructed using dedicated digital logic devices, as a firmware program written into a programmable memory that forms part of a programmable controller for shared devices, or as a mask programmed read only memory module that has been engineered into a computer based control system or device.

In FIG. 2, the shared medium storage controller 29 (or controllers) is connected to the member computers of a cluster of computers by means of a computer communications network 23. The shared medium controller 29 is connected to the physical storage devices by means of a storage device controller and suitable cable connection. Typical storage medium connections include, but are not limited to, direct attachment using a SCSI cable, direct attachment using a IDE cable, attachment via a RAID controller card and a Fiber Channel optical cable, direct attachment via a frame buffer controller card and direct attachment using a channel adaptor interface. Typical computer communications network 23 connections include, but are not limited to, Ethernet based networks, InfiniBAND networks, ATM networks, switched crossbar networks and shared backplane systems.

The computers that comprise the cluster typically are executing application code that results in the initiation of data retrieval and data modification transactions that are transmitted via the computer communications network 23 to the shared storage medium controller 29 for execution. The result of execution of the transactions by the shared storage medium controller 29 is the transmission via the computer communications network 23 back to the initiating computer of a response message. The format and contents of the response message depends on the type of the original transaction, and may be limited to the return of status information regarding the results of the transaction, or may contain actual data elements retrieved from the shared storage medium 27.

In a feasible and preferred embodiment of the present invention, the computer communications network 23 used to transport transactions and responses between the computers of the cluster and the shared storage medium controller 29 is an Ethernet network 23. On the Ethernet network 23, transactions and responses are transported using the well known TCP/IP communications protocol. The format of the transaction and transaction response messages transmitted over the computer communications network 23 conforms to the published iSCSI Draft Version 20 standard.

The software that embodies the present invention is executed by a general purpose processor embedded within the shared storage medium controller 29. The software acts as a server that accepts transactions from one or more client computers 21, decodes the embedded transaction commands and command parameters, verifies the validity and integrity of the commands, parameters and any attendant data, and, for properly formatted transactions, schedules the transaction for execution. In the preferred embodiment of the present invention, the format of the commands, parameters and data conforms to the published SCSI-III device control standard.

For each transaction that is accepted for execution by the shared storage medium controller 29, at some time determined by the scheduling scheme that is the object of this patent, the transaction is executed. The shared storage medium controller 29 determines the results of the execution of the transaction, formats a response message with appropriate return information, and transmits the response message back to the computer that initiated the transaction.

Scheduling of Transaction Execution

In a shared storage medium 27 context, where there is no client based transaction scheme in operation, the arrival times of transactions will typically be random with a Poisson distribution. The provenance of transactions will depend on the nature of the applications being executed on the computers that form the cluster. From any specific computer in the cluster, however, the expected distribution of the arrival times of transactions will also be random and Poisson distributed. The result of these characteristics is that the input queue of transactions will inevitably contain transaction requests that, if executed immediately, would potentially result in data elements with incorrect contents being returned to the originating client computers 21.

Figure 3:
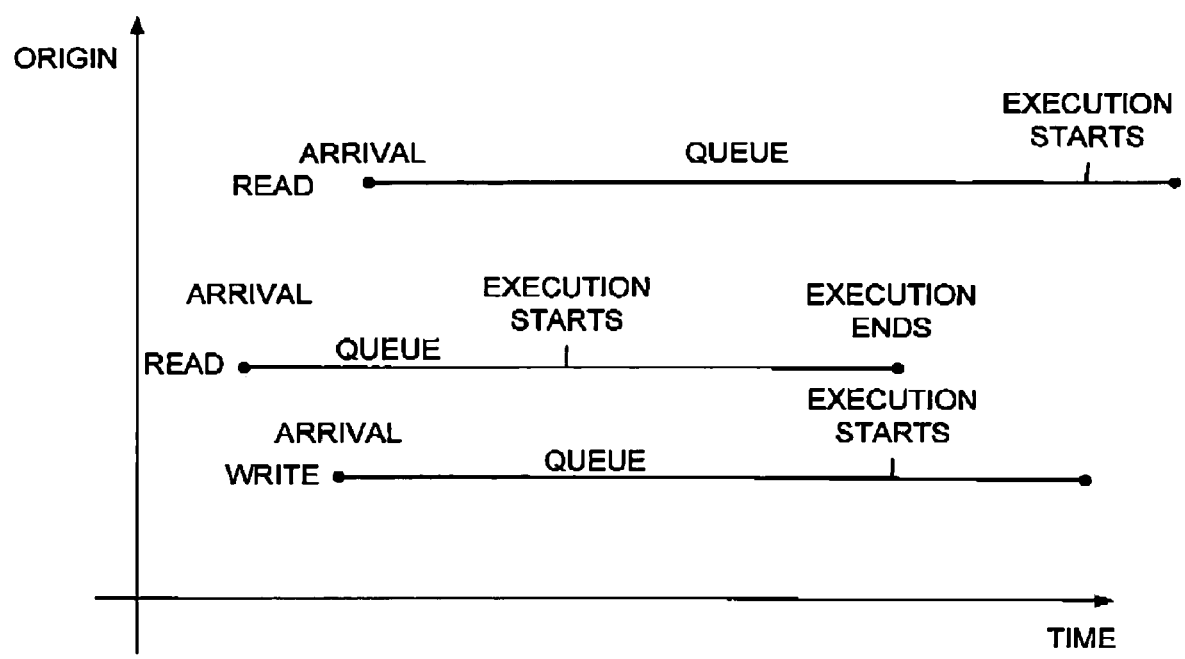
FIG. 3 is a schematic diagram of a chronology of transactions arriving at a shared storage medium controller for execution.
Figure 4:
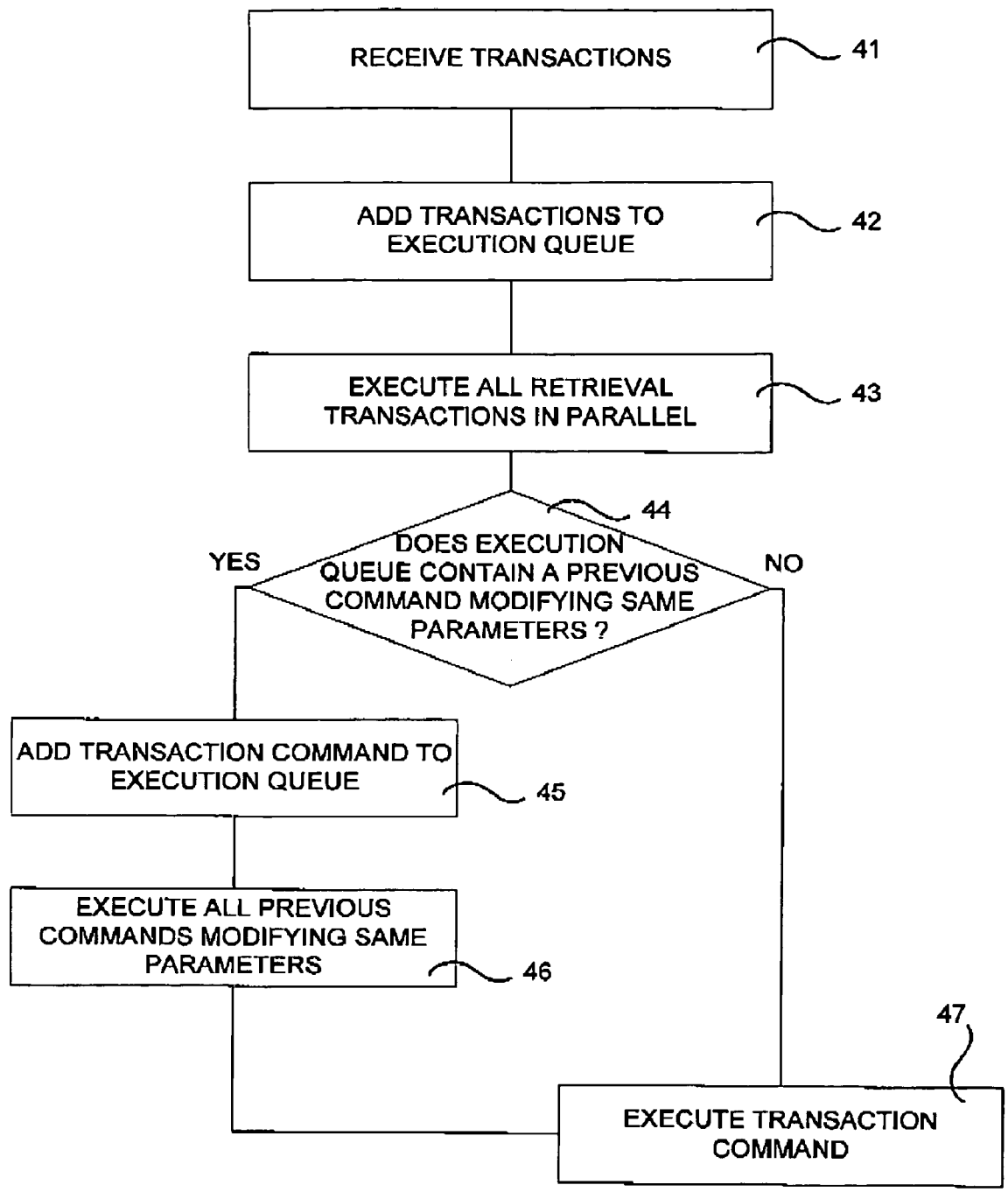
FIG. 4 is a block diagram of a method for scheduling transactions arriving at a storage medium controller according to a preferred embodiment of the present invention.

FIG. 3 shows the arrival times and durations of several transactions originating from different computers in the cluster. Each of these transactions potentially act on the same data elements on the shared storage medium 27, moreover some of the transactions may be data retrieval operations and some of them data modification operations. Clearly, an undesirable result of the execution of the ensemble of transactions would be a data modification transaction having the effect of changing some or all of the data elements being read in response to a retrieval operation that had already been started.

The goal of the scheduling algorithm is to ensure that the results of a transaction reflect the actual state of the data elements stored on the shared storage medium 27. There are two types of transaction that are relevant, read transactions and write transactions.

When an application on a client computer 21 issues a read transaction, it expects to get back a response message that contains the data elements stored on the shared storage medium 27 in the state that they were when the transaction was initiated. The best effort result typical of all storage devices actually returns a response message which contains the data elements in the state they are when the storage medium controller 29, whether shared or not, recognizes a valid transaction and schedules it for execution. The present invention is a scheduling scheme that ensures that all read transactions receive the requested data elements in the state that they were in appropriate to the chronology of the transaction's arrival at the input queue of the shared storage medium controller 29.

The scheduling scheme operates by creating 42 an ordered queue of all transactions impinging on the shared storage medium controller 29. The ordering of the queue is such that the time sequence of transaction request arrivals is preserved. A critical element of the ordering of the transactions is that, for a given data element on the shared storage medium 27, the incidence of a data modification transaction on that data element acts as a barrier. Before a data modification request can be processed, all pending data retrieval requests with an arrival time precedence must be completed.

Once valid transaction requests are queued for execution by the shared storage medium controller 29, a number of concurrent processes on the controller 29 retrieve queued transactions and, subject to the barrier constraint imposed by pending data modification transactions, execute the transactions and return a response message to the originating computer. The following description shows the flow of control associated with a transaction queue handler process.

The queue is a tree structure whose branch points are instances of transactions that present barriers due to either the use of a client requested lock or due to the creation of an implied lock because of a pending write transaction on a data element. The queue worker process continually traverses the queue looking for transactions that may be dispatched. A transaction may be dispatched when it is not locked or subordinated to a lock.

Below a transaction sporting a lock is a branch of the queue that is a list of all of the transactions that are queued behind the lock. These transactions will all operate on the same data element or data elements to which the lock that created the branch refers. Within this branch there may occur instances of barriers that may refer to some or all of the data elements that are covered by the original lock. The general form of the queue is that of a root with branches descending off the root where instances of barriers occur. Along the branches, the same style of structure may occur.

The queue worker process starts at the root of the queue and proceeds along the root, dispatching any transactions that are not sporting locks. Queue entries that have descendants are instances of transactions that previously were locked and acted as barriers. The queue worker process descends these branches in the same manner as the root is traversed, dispatching any transactions that are not locked. As soon as the queue worker encounters a lock, it stops descending the branch and resumes descending the root.

Once the worker process reaches the end of the root of the queue, it restarts its traversal at the beginning.

The scheduling scheme therefore allows read transactions to be retrieved from the processing queue and to be executed concurrently, until a data modification transaction, such as a write transaction, is retrieved from the queue. In that case, until the write transaction has finished executing, no read transactions may be executed on the same data element.

Leases

The shared storage medium controller 29 maintains a list of data structures, each element of which is a termed a lease. The function of a lease is to cache the state of one or more data elements in the memory of the shared storage medium controller 29 so that the state of data elements can be rapidly determined. In the preferred embodiment of the present invention, leases are maintained in a double linked binary tree structured list.

Each lease represents the state of the data element or range of data elements covered by the lease. The state of the data elements covered is defined by a version number that defined the edition of the data element or elements. Version numbers are initially assigned when a data element is created and are changed when a data element or elements are modified by data modification transactions.

Lease Management

Initially, on an empty storage medium 27, a single lease is created that holds the initial version number of all of the data elements that can be stored on the medium 27. As data elements are created on the medium 27, the initial lease represents the state of the data elements. When a data element is first modified by a data modification transaction, a new lease is created by splitting the initial list into a lease for the newly created data element or elements and a lease for all of the other unmodified data elements. The version number of the new lease is computed by incrementing the version number of the old lease. Subsequent modification of the data element or data elements covered by a lease will result in either a further splitting of the lease where only part of the span of the lease is affected by the data modification, or by the simple incrementing of the version number of the current lease where the data modification transaction covers the entire span of the lease.

Where a data modification transaction has the effect of updating the contents of a number of data elements that are covered by separate leases, the lease management scheme can combine the separate leases into a single new lease that spans the range of modified data elements. Joining multiple independent leases into a single lease with an appropriate span has the effect of reducing the total number of leases in the list of leases that needs to be searched when a new transaction is processed.

During the execution of transactions, a process that always takes a finite amount of time that depends on the nature of the transaction, leases are locked to prevent modification of their version number. The effect of locking a lease is to prevent new transactions that could require an alteration of the lease from being executed. In practical terms, this means that a queue handler process is prevented from modifying the contents of a data element while the associated lease is locked.

Handling of Read Transactions

A read transaction is a request by a client computer 21 for one or more data elements that are recorded on the shared storage medium 27. When a queue handler process retrieves from the execution queue a read transaction, it first determines whether the data element or elements that are its object are currently of interest to any other of the computers in the cluster. If the lease for the data element is locked, then the read operation cannot proceed and it is reinserted into the execution queue of pending operations.

Figure 5:
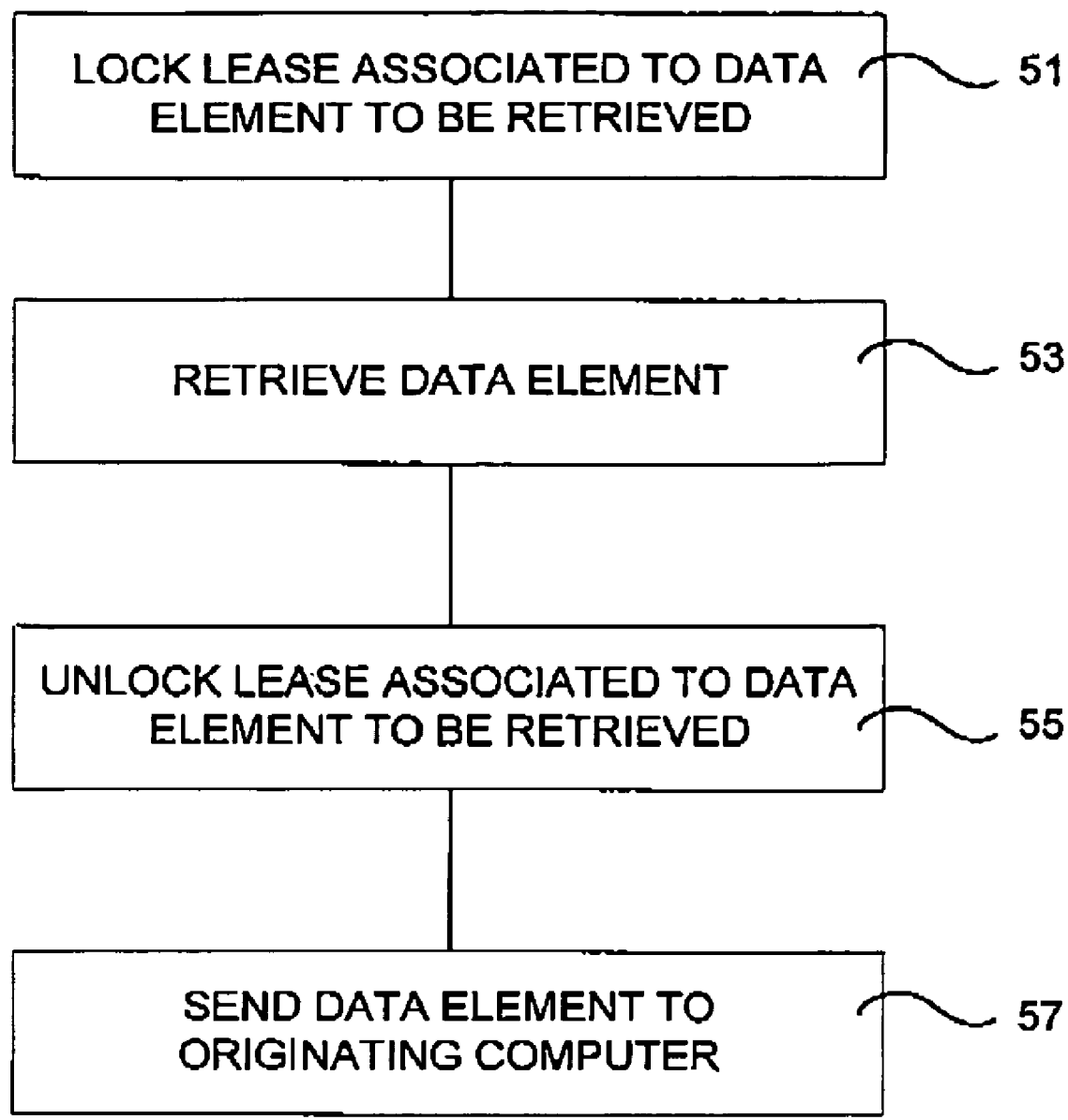
FIG. 5 is a block diagram of a method of executing read transactions according to a preferred embodiment of the present invention.

The handling and execution of read transactions requests will now be explained with reference to FIG. 5. If the lease for the data element or elements requested is not locked, then the requested transaction proceeds immediately. The sequence of events that occurs during the execution of the transaction is as follows: the appropriate lease or leases are locked for a read operation 51. The data element is read 53 from the shared storage medium 27 and the associated lease or leases are unlocked 55. The data element or elements are sent back 57 in a response packet to the originating computer client.

Read transactions may optionally specify the requested version number of the data element or elements as part of the transaction. Where a read transaction contains a version number, the leases for the appropriate data element or elements are used to compare the requested version number with the current lease version number. If the version numbers match, then the handling of the read transaction proceeds as follows:

1. The lease or leases are not locked for the read operation.
2. A response message indicating that the leases match is sent immediately to the computer that originated the read transaction.

If, on the other hand, the version numbers in the lease or leases do not match those in the transaction request, then the client computer 21 receives back the actual current contents of the data element or elements and the new version number or version numbers.

The latter procedure for handling read operations allows client computers 21 to implement an optimization procedure using their local buffer storage that obviates the need to retransmit copies of data elements that the client computer 21 already has in local storage, if the data element or elements have not been modified.

In the case of a read transaction accessing multiple data elements at once, each data element would be scheduled to be read separately by an appropriate read command. The read commands would be scheduled to be executed in parallel and the results would be sent back to the originating client computer 21 together in one response packet. If, for example, one of the read commands is pending waiting for a lease to become unlocked, then the response packet will not be sent to the originating client computer 21 until the read command has finished executing.

All response messages to the originating client computers 21 contain the current, according to the appropriate lease or leases, version numbers for the returned data element or elements. The iSCSI protocol provides for the transmission of optional application related data in its response packets. This protocol field is used to transmit back to the originating client computer 21 the state of the data element or elements that are the subject of transactions. The current version number of the data element or elements defines the state of the data element or elements.

Handling of Write Transactions

A write transaction is a request by a client computer 21 to modify the contents of one or more data elements on the shared storage medium 27. When a queue handler process retrieves from the queue a write transaction, it consults the appropriate leases for the relevant data element or elements. If the lease or leases are locked either for pending read operations or for pending write operations, the transaction cannot proceed and it is reinserted into the transaction queue.

Write transactions on a data element or elements act as barriers in the transaction queue. All transactions, whether read or write, that have arrival times subsequent to a given write transaction are blocked from execution until the incident write transaction is complete. The queue handler processes on the shared storage medium controller 29 will not dispatch any transaction that is chronologically later than an incomplete or pending write transaction on the same data element or elements.

Figure 6:
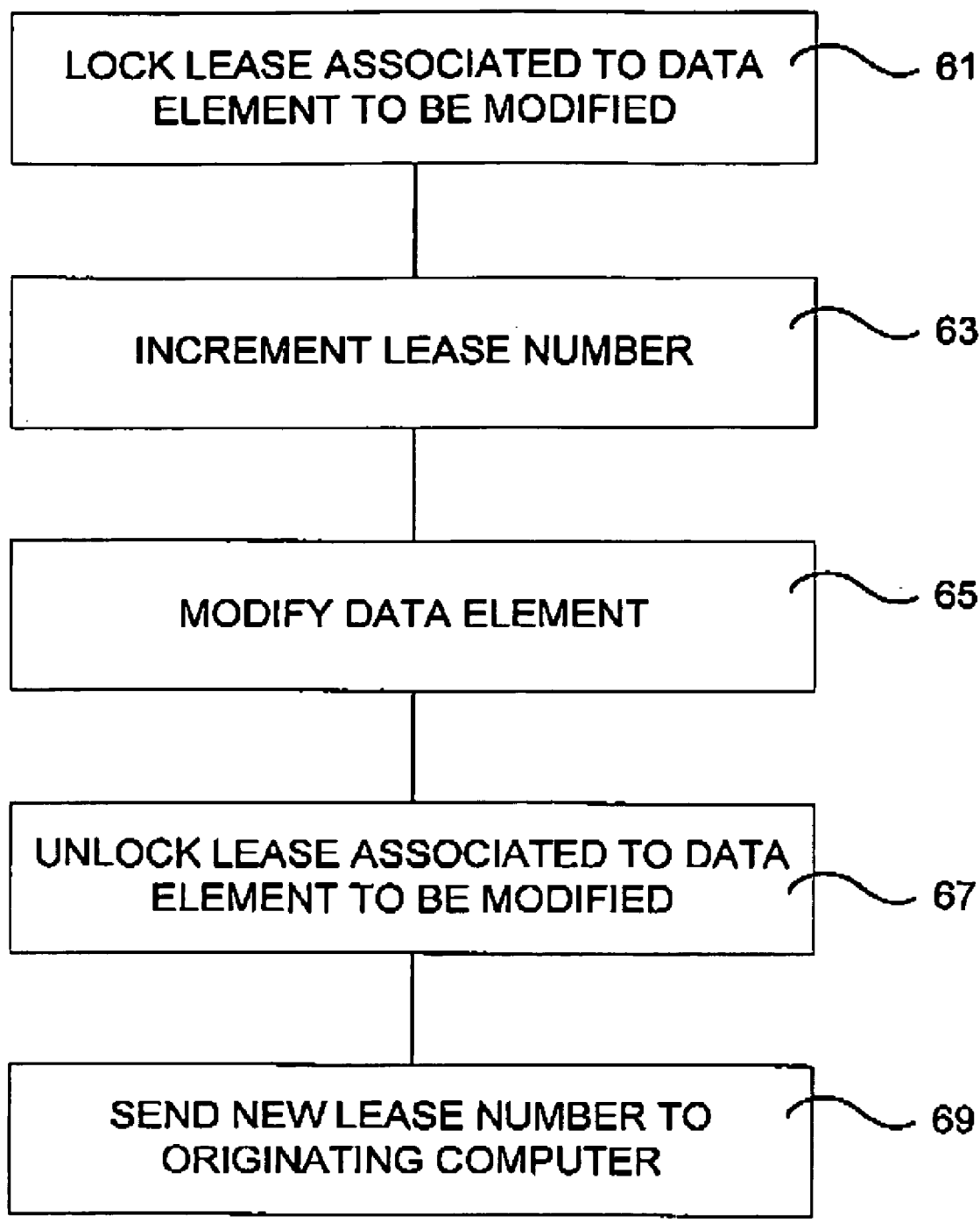
FIG. 6 is a block diagram of a method of executing write transactions according to a preferred embodiment of the present invention.

Now, referring to FIG. 6, when a write transaction on a data element or elements is dispatched, the following sequence of operations occurs. First, the appropriate lease or leases are locked 61 for a write operation. Then, the version numbers of the lease or leases are incremented 63. The data element or elements are modified 65, following which, the lease or leases are unlocked 67. Once the write transaction is completed, a response message containing the new version numbers of the data elements is returned 69 to the originating computer.

Completion of a write transaction has the effect of removing the barrier on transactions on the data element or elements. The queue handler processes on the shared storage medium controller 29 resume processing any pending transactions on the data element or elements.

Application Locks

Some applications, such as file systems, distributed computational applications and parallel algorithms, have a requirement to implement multi-transaction locking of data elements. The application wishes to gain exclusive access to data elements on the shared storage medium 27 for a period of time that transcends that of an individual read or write transaction, and implements a mechanism for transmitting lock requests to the shared storage medium controller 29. The sequence of operations that occurs is as follows:
1. The application requests a lock on one or more data elements
2. The leases associated with the data elements are locked and the requesting client's identity is recorded as the owner of the lock.
3. For all subsequent transactions related to the relevant data elements, if they originate with the lock owner, they are processed immediately in their order of arrival.
4. For transactions that do not originate with the lock owner, the transactions are queued for executions at a subsequent time, following release of the lock by the owner.
5. The application sends a request to the shared storage medium controller 29 to release the lock. The controller 29 clears the application locks on the relevant leases and proceeds to process the queued transactions.

Application lock requests are themselves handled in the same manner as other types of client transactions. The same queue algorithm as is used for read and write transactions is used to ensure the correct time sequence of lock requests originating from multiple clients.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for retrieving and modifying data elements on a shared medium, comprising:
   receiving at a shared medium controller, and from multiple clients, transaction requests, each of said transaction requests being for at least one of reading and writing a data element on said shared medium;
   adding said transaction requests to an execution queue in order;
   retrieving from said execution queue all read transaction requests for said data element;
   executing all of said read transaction requests for said data element in parallel, until a write transaction request for said data element is retrieved from said execution queue, and according to said order;
   executing said write transaction request for said data element and queuing all incoming read transaction requests for said data element until said write transaction request is completed;
   determining and changing a state associated with said data element for each of said executing of said transaction requests, said state stored in said shared medium controller; and
   whereby data retrieval transactions on said data element, originating from one or more clients, are not compromised by data update transactions on said data element originating from other clients.

2. The method as claimed in claim 1, further comprising:
   checking whether a version state associated with said data element is locked;
   if said version state is locked,
      adding said transaction request for said data element to an execution queue;
   if said version state is not locked,
      executing said transaction request right away.

3. The method as claimed in claim 2, wherein said version state is locked following a transaction request originating from a client.

4. The method as claimed in claim 1, wherein said data elements are referred to as pointers defining an address range.

5. The method as claimed in claim 4, wherein a read transaction for multiple data elements is executed for all of said data elements which are not waiting for a pending write transaction, and following completion of said pending write transaction, remaining data elements are read.

6. The method as claimed in claim 4, wherein said shared medium controller maintains a list of version state information associated with said data elements on said shared medium and following modification of said data elements, said shared medium controller creates a new data structure in said list containing a new version state of said data elements and associating said new version state with a part of said data elements that has been modified.

7. The method as claimed in claim 6, wherein if said data elements being modified are associated with multiple separate data structures containing version states, creating a new single data structure in said list associated with all modified said data elements and removing said multiple separate data structures from said list.

8. The method as claimed in claim 6, wherein said version state is an initial version number and wherein said initial version number is incremented to obtain said new version state.

9. The method as claimed in claim 6, wherein said list of data structures is a double linked binary tree list.

10. The method as claimed in claim 1, wherein said read transaction request and execution comprises:
    providing to said shared medium controller a client-stored version state information associated with said data element to be read;
    comparing said client-stored version state information associated with said data element with a shared medium-stored state information;
    sending back to originating client a confirmation that said client-stored version state information and the contents of said data element are accurate.

11. The method as claimed in claim 1, wherein said shared medium controller is physically located with the shared medium.

12. A method for executing a common task in a clustered computing environment comprising a plurality of computers interconnected to collaborate on said common task, said plurality of computers including at least a client computer and a shared storage medium storing data elements, comprising:
    receiving at a shared medium controller, and from said plurality of client computers working on a same task, transaction requests, each of said transaction requests being for at least one of reading and writing a data element on said shared storage medium;
    adding said transaction requests to an execution queue in order;
    retrieving from said execution queue all read transaction requests for said data element;
    executing all said read transaction requests for said data element in parallel, until a write transaction request for said data element is retrieved from said execution queue, and according to said order;

executing said write transaction request for said data element and queuing all incoming read transaction requests for said data element in said execution queue in order until said write transaction request is completed;

determining and changing a state associated with said data element for each of said executing of said transaction requests, said state stored in said shared medium controller; and at least one of said plurality of computers modifying said data element stored on said shared storage medium;

said client computer retrieving said data element stored and using said data element stored to execute said common task;

whereby data retrieval transactions on said data element, originating from one or more client computers, are not compromised by data update transactions on said data element originating from other client computers.

13. The method as claimed in claim 12, further comprising:

checking whether a version state associated with said data element is locked;

if said version state is locked,
  adding said transaction request for said data element to an execution queue;

if said version state is not locked,
  executing said transaction request right away.

14. The method as claimed in claim 13, wherein said version state is locked following a transaction request originating from a client.

15. The method as claimed in claim 12, wherein said data elements are referred to as pointers defining an address range.

16. The method as claimed in claim 15, wherein a read transaction for multiple data elements is executed for all of said data elements which are not waiting for a pending write transaction, and following completion of said pending write transaction, remaining data elements are read.

17. The method as claimed in claim 15, wherein said shared medium controller maintains a list of version state information associated with said data elements on said shared medium and following modification of said data elements, said shared medium controller creates a new data structure in said list containing a new version state of said data elements and associating said new version state with a part of said data elements that has been modified.

18. The method as claimed in claim 17, wherein if said data elements being modified are associated with multiple separate data structures containing version states, creating a new single data structure in said list associated with all modified said data elements and removing said multiple separate data structures from said list.

19. The method as claimed in claim 17, wherein said version state is an initial version number and wherein said initial version number is incremented to obtain said new version state.

20. The method as claimed in claim 17, wherein said list of data structures is a double linked binary tree list.

21. The method as claimed in claim 12, wherein said read transaction request and execution comprises:

providing to said shared medium controller a client-stored version state information associated with said data element to be read;

comparing said client-stored version state information associated with said data element with a shared medium-stored state information;

sending back to originating client a confirmation that said client-stored version state information and the contents of said data element are accurate.

22. The method as claimed in claim 12, wherein said shared medium controller is physically located with the shared medium.

* * * * *